May 5, 1942. H. C. MOORE 2,281,591
METHOD OF MAKING A COMPOSITE SHEET
Filed April 28, 1937
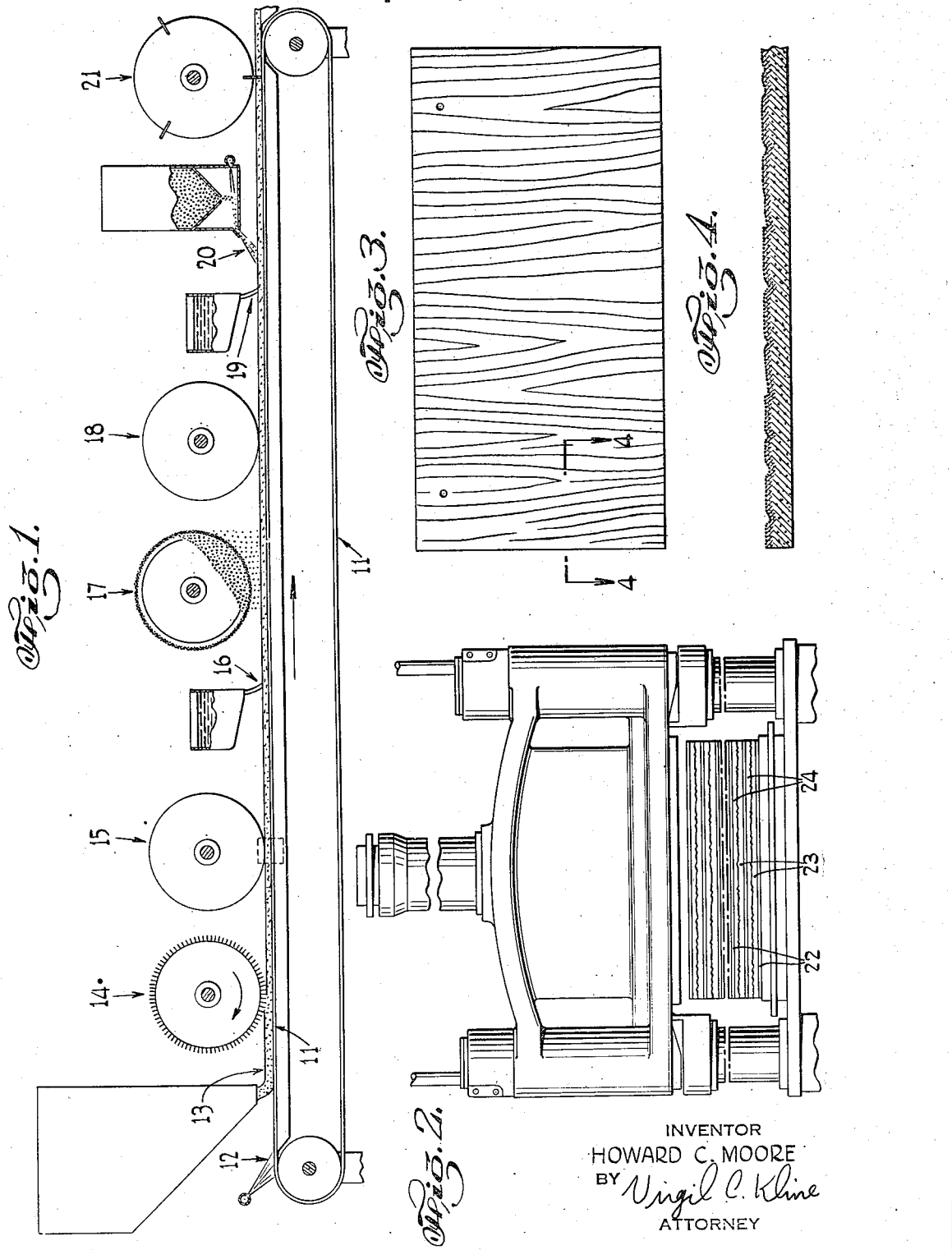
INVENTOR
HOWARD C. MOORE
BY Virgil C. Kline
ATTORNEY Patented May 5, 1942

2,281,591

UNITED STATES PATENT OFFICE 2,281,591

METHOD OF MAKING COMPOSITE SHEETS

Howard Cary Moore, Somerville, N. J., assignor to Johns-Manville Corporation, New York, N. Y., a corporation of New York Application April 28, 1937, Serial No. 139,352

3 Claims. (Cl. 18—48)

This invention relates to a composite sheet and the method of making the same. More particularly, it relates to fibre-reenforced cementitious products such as asbestos and cement shingles or siding units including a base layer and a continuous colored veneer coating adhered to the said layer.

The invention comprises the hereinafter described method and product and will be illustrated by description in connection with the attached drawing.

Fig. 1 is a diagrammatic side view of an assembly of suitable apparatus for performing a series of steps in the manufacture of my improved article.

Fig. 2 is a similar view of equipment for conducting a subsequent step in the manufacturing process.

Fig. 3 is a face view of my improved colored sheet.

Fig. 4 is a sectional view on line 4—4 of Fig. 3.

In general, the method that is used includes forming a layer including an intimate mixture of a hydraulic cementitious material and reenforcing fibres; applying over this layer the colored veneer coating including an intimate mixture of a hydraulic cementitious material and reenforcing fibres and, in addition, pigment to establish the color desired; applying water so that the total amount of water in the base and in the coating is adequate and preferably substantially in excess of that required for the curing or hardening of the cementitious material; subjecting the composite so made to very strong compression, to densify it, to consolidate the base and veneer coating, and to cause the removal of excess water therefrom; and then hardening the composite. In the preferred embodiment, the method comprises keying the veneer to the base by producing conforming irregularities in the contacting surfaces and for steam curing the compressed composite.

The fibres selected are preferably chrysotile asbestos, although there may be used, for most purposes, fibres of crocidolite or amosite, provided the fibres have been milled or cut to about the lengths which will be described as suitable when chrysotile fibres are used.

The cementitious material that is preferred is Portland cement. Other forms of cement, such as calcium aluminate cement may be used, but do not possess advantages commensurate with their increased cost or do not give products as satisfactory, economically or otherwise, as the Portland cement. Plaster-of-Paris may be used, especially when the product is for interior use.

The pigmentary material selected is one that is not unfavorably affected by the other ingredients of the composition or by the steps used in the manufacture, as for instance, by the steam curing which will be described. Typical pigments that may be used in establishing the various colors are chrome oxide green, titanium oxide, lead chromate, colored iron oxides, or the like.

When the product is to be steam cured, there is incorporated with the Portland cement finely divided silica admixed in amount approximately equal, along with the silica originally present in silicates in the Portland cement, to that required theoretically to convert the basis ingredients of the Portland cement to monosilicates. With an average grade of Portland cement, I use approximately 58 parts by weight, say 30 to 70 parts, of the admixed silica to 100 parts of the cement. A good grade of clean fine sand is a satisfactory variety of silica. So is ground quartz.

In the base layer, the proportions of asbestos to Portland cement and the grade or length of the asbestos fibres may be approximately those which are usual in the manufacture of asbestos and Portland cement shingles or siding units, say 80 to 120 parts by weight of the fibres (of screen test 0—0—8—8 by the Quebec standard method) to 100 parts of the cement. On the other hand, the fibres in the veneer coating are preferably much shorter than those in the base. Thus, there is used to advantage, in the veneer coating, a grade of chrysotile asbestos fibres that in typical specimens shows more than 50% by weight and, suitably, about 85 to 90 per cent passing through a 10-mesh screen, in the standard asbestos screening test.

The proportion of the fibres in the veneer coating should be carefully controlled, within the range of about 27 to 45 parts by weight to 100 parts of the dry weight of the veneer and, preferably, within the range of 30 to 40 parts of fibres. When used in a proportion much above 45 parts by weight, the fibres make the veneer too fibrous to work well; with a proportion of fibres much below 27 parts by weight, there is insufficient bonding of the veneer to the base layer in the finished product and excessive tendency to splitting or cracking of the veneer.

A typical veneer that has been used to advantage is one containing the following proportions:

| Ingredient: | Parts by weight |
|---|---|
| Short Canadian chrysotile asbestos fibres of the kind described | 30 |
| Portland cement | 41 |
| Admixed finely divided silica (Silex) | 25 |
| Green chromium oxide | 4 |

A specific example of the invention is the following:

Across the endless belt 11, of duck or the like, there is spread water in any suitable manner at position 12. Then there is disposed upon the conveyer the dry materials 13 which are to form the base layer in the finished product, these materials being fed suitably from the hopper and spread as nearly uniformly thick as possible across the conveyer, from positions near to each edge thereof. The picker roll 14 approximately levels the layer, the leveling being made more nearly exact by means of the smooth-faced roller 15 which rests upon the layer passing thereunder and packs it only lightly. Additional water is spread at 16, across the smoothed surface of the base layer.

Then there is applied the colored veneer coating, as by the rotating screen drum 17.

It will be understood that the base layer, as well as the veneer, preferably comprises asbestos, Portland cement, and admixed silica, as described. In both the base layer and veneer, the asbestos fibres are distributed in random arrangement throughout the cementitious mixture.

The veneer is applied dry or substantially so, as evenly as possible over the upper face of the base layer. Because the said face has been just previously wetted, the veneer layer becomes established with respect to the face of the base layer, with minimized tendency to shift or develop bare spots through which the base may be exposed. The veneer is then smoothed over its upper surface as by the roller 18 and wetted at position 19 with additional water.

The total water that is added may be about equally divided between that applied at positions 12, 16, and 19 respectively. Also, the water at these positions is preferably allowed to flow gently down a cloth apron which spreads the water practically uniformly across the entire width of the sheet of materials passing thereunder. Fine sand is applied, as by air-spraying, at 20.

After this treatment, the material is passed under the cutter roller 21 which forms the sheet into segments which are slightly larger than the finished units into which the segments are finally cut.

These segments are removed from the conveyer at the end thereof at the right of Fig. 1, and are stacked into an assembly for hydraulic compression.

This assembly includes, in alternation, substantially rigid metal supporting plates 22, a sheet 23, of the fibre-reenforced composite taken from the conveyer 11, a texture plate 24 provided with irregularities of surface on the face thereof turned towards the said sheet, another of the metal plates, and so on. In the assembly, the veneer coating is in contact with the said irregularities.

The texture plates may be constituted largely of a hardened phenolaldehyde condensation product or the like. Brass or the like also may be used as the composition of the plates. The plates are preferably substantially rigid.

The stack of alternating metal plates, sheets of material, and texture plates is strongly compressed in the hydraulic press 21 which is illustrated generally and is conventional. The plunger of the press is brought down upon the topmost plate and the pressure increased suitably to a maximum of about 5,000 to 12,000 lbs. per square inch on the assembly.

During this compression there is a flowing of water through the fibre reenforced sheet material, and across the interface between the base and veneer, also the texture plates form the negative of their pattern as irregularities in the fibre reenforced material which at this stage is readily deformable. In fact, there are formed alternating elevations and depressions on the upper surface of the base layer and conforming irregularities on the lower surface of the veneer. The result is a keying in or locking together of the thick but continuous veneer coating and the base material. The compression also densifies the material and removes from it most of the water in excess of that required to hydrate the Portland cement during the subsequent curing operation. The base and veneer are partly blended at the interface. After water nearly ceases to flow from the fibre reenforced material at the maximum pressure, the pressure is released and the Portland cement in the compressed material is then hardened.

For best results the segments made and compressed as described are trimmed after the Portland cement therein has set to an extent permitting handling without excessive breakage but before the veneer layer has become brittle. Thus, I prefer to allow the Portland cement to set to an extent of the order of that produced by standing for about two to five, say three days, at atmospheric temperature and then immediately trim and punch to form the dimensions or the holes desired in the finished shingle or siding units. The punching and cutting are made by conventional cutting and punching equipment. When these operations are performed at this stage, there is very little cracking or chipping of the veneer layer or separation of it from the base.

After the trimming and punching are completed, the hardening of the Portland cement is then continued.

I have found it very desirable, in making a satisfactory veneered unit, to complete the hardening by steam-curing. This curing is effected by subjecting the article, including water, asbestos fibres, Portland cement, and admixed silica and subsequent to the initial curing and punching and trimming described, to practically saturated steam at superatmospheric pressure, as, for instance, at a pressure of 70 to 120 pounds to the square inch. A day of steaming under these conditions is adequate.

The product so made shows firm adherence of the veneer to the base and good uniform color of the veneer face. Also, it shows a minimum tendency to warpage or separation of the veneer from the base on wetting of the veneer and base to different extents. The coefficients of expansion on exposure to varying humidities are not only approximately the same in both the base and veneer but also are made relatively small by the steam curing.

While various thicknesses of layer and coating may be made, thicknesses that are satisfactory and that are typical are about as follows:

Base material, ⅛ to ⅜ inch, and veneer coating, 1/16 to ⅛ inch.

When it is desired to use a thin veneer coating, then the possibility of base material, of different color from that of the veneer, showing through the veneer is minimized by the application of a thin film of a coloring composition, in addition to the dry veneer described. Thus, there may be applied at position 16 not only water but a suspension therein of a colored veneer, as for example, a mixture of 50 to 85 parts by weight of Portland cement with 15 to 50 parts of a pigment or pigmentary mixture, the suspension, for instance, including ten pounds or so of the colored veneer to 2½ gallons of water. With such a wet composition applied, the rest of the process is conducted as described above, with the exception of the use of possibly somewhat thinner coating of the veneer applied dry. The color of the dry veneer should approximate that of the wet composition, so that the undesired variations of color due to bare spots may not be experienced.

For some purposes the wet coloring composition may be applied on top of the dry veneer, as for example, in the water supply at 19.

A suitable pattern which, impressed, gives the proper irregularities to the contacting surfaces of the base material and veneer coating is that shown in Fig. 3, and in cross section in Fig. 4. Here the irregularities take the shape of irregular corrugations or graining. Obviously, other patterns may be used for the keying in effect, so long as the irregularities are of substantial depth, numerous, and closely spaced.

It will be understood that the details given are for the purpose of illustration not restriction and that variations within the spirit of the invention are intended to be included in the scope of the appended claims.

What I claim is:

1. The method of making a composited article which comprises forming a layer of an intimate compressible mixture of asbestos fibres and hydraulic cementitious material, applying to a face of said layer a dry veneer coating including an intimate compressible mixture of asbestos fibres, hydraulic cementitious material and pigmentary material, wetting the resulting composite, applying pressure to said composite in such a manner as to form depressions in the veneer coating that extend into the layer and as to force excess water from and densify the composite, partially hardening the hydraulic cementitious material, trimming the composite to the desired dimensions, and then completing the hardening of the hydraulic cementitious material.

2. The method of making a composited article which comprises forming a layer of an intimate compressible mixture of asbestos fibres and hydraulic cementitious material, applying to a face of said layer a thin coating of a wet coloring composition, applying over said coating a dry veneer including an intimate compressible mixture of asbestos fibres, hydraulic cementitious material and pigmentary material, wetting the resulting composite, applying pressure to said composite in such a manner as to form depressions in the veneer coating that extend into the layer and as to force excess water from and densify the composite, partially hardening the hydraulic cementitious material, trimming the composite to the desired dimensions, and then completing the hardening of the hydraulic cementitious material.

3. The method of making a composited article which comprises forming a layer of an intimate compressible mixture of asbestos fibres and hydraulic cementitious material, applying to a face of said layer a dry veneer coating including an intimate compressible mixture of asbestos fibres, hydraulic cementitious material and pigmentary material, wetting the resulting composite, applying pressure to said composite in such a manner as to form depressions in the veneer coating that extend into the layer and as to force excess water from and densify the composite, and then hardening the hydraulic cementitious material.

HOWARD CARY MOORE.